(12) United States Patent
Collins et al.

(10) Patent No.: US 12,454,359 B2
(45) Date of Patent: Oct. 28, 2025

(54) DOUBLE BENCH SEAT FOR AIRCRAFT PASSENGERS

(71) Applicant: AIRBUS ATLANTIC, Rochefort (FR)

(72) Inventors: Alexandra Collins, Rochefort (FR); Mark Collins, Rochefort (FR); Jean-Baptiste Bruyère, Versoix (CH); Matthias Doaré, Carouge (CH)

(73) Assignee: AIRBUS ATLANTIC, Rochefort (FR)

( * ) Notice: Subject to any disclaimer, the term of this patent is extended or adjusted under 35 U.S.C. 154(b) by 0 days.

(21) Appl. No.: 18/019,419

(22) PCT Filed: Aug. 3, 2021

(86) PCT No.: PCT/EP2021/071627
§ 371 (c)(1),
(2) Date: Feb. 2, 2023

(87) PCT Pub. No.: WO2022/029105
PCT Pub. Date: Feb. 10, 2022

(65) Prior Publication Data
US 2023/0286655 A1 Sep. 14, 2023

(30) Foreign Application Priority Data
Aug. 3, 2020 (FR) ...................................... 2008246

(51) Int. Cl.
*B64D 11/06* (2006.01)
(52) U.S. Cl.
CPC ...... *B64D 11/0641* (2014.12); *B64D 11/0601* (2014.12); *B64D 11/0602* (2014.12); *B64D 11/0606* (2014.12)
(58) Field of Classification Search
CPC ............ B64D 11/0601; B64D 11/0602; B64D 11/0606; B64D 11/0641
See application file for complete search history.

(56) References Cited

U.S. PATENT DOCUMENTS

2007/0164591 A1* 7/2007 Doebertin ............ B62D 47/003
297/245
2009/0102256 A1* 4/2009 Staab ................. B64D 11/0606
297/216.13

(Continued)

FOREIGN PATENT DOCUMENTS

| EP | 3 437 996 | 2/2019 |
| NZ | 507 653 | 6/2001 |
| WO | 2019/070194 | 4/2019 |

OTHER PUBLICATIONS

International Search Report with English translation for PCT/EP2021/071627, mailed Oct. 13, 2021, 4 pages.

(Continued)

*Primary Examiner* — Joshua D Huson
*Assistant Examiner* — Peter A Taraschi
(74) *Attorney, Agent, or Firm* — Nixon & Vanderhye P.C.

(57) ABSTRACT

The disclosure concerns a double bench seat for transport craft passengers having a sitting configuration and a lying configuration, and including a substantially vertical shell surrounding two independent twin seats. The two twin seats are oriented along the longitudinal axis of the aircraft, the two twin seats each assume, independently of one another, at least one chair-like position and one bed-like position, the two twin seats include a backrest and a seat, in the bed-like position, the two twin seats are extended by an extension. When the double bench seat is in the lying configuration, the two twin seats are in the bed-like position and arranged to be at the same height and to form a continuous horizontal surface with a width and length adapted to form a double bed that can accommodate two lying persons.

12 Claims, 4 Drawing Sheets

(56) References Cited

U.S. PATENT DOCUMENTS

2016/0257408 A1* 9/2016 Gill .................... B64D 11/0606
2018/0105273 A1* 4/2018 Robinson ........... B64D 11/0606

OTHER PUBLICATIONS

Written Opinion of the ISA for PCT/EP2021/071627, mailed Oct. 13, 2021, 6 pages.

* cited by examiner

DOUBLE BENCH SEAT FOR AIRCRAFT PASSENGERS

CROSS REFERENCE TO RELATED APPLICATIONS

The present application is a National Phase of International Application Number PCT/EP2021/071627 filed Aug. 3, 2021, which designated the U.S. and claims priority benefits from French Application Number FR2008246 filed Aug. 3, 2020, the entire contents of each of which are hereby incorporated by reference.

The invention relates to a double bench seat for aircraft passengers. The invention also relates to the arrangement of such double bench seats in an airplane.

The layout of the cabins of aircraft greatly impacts the comfort of the passengers and forms a significant commercial issue, in particular on long-haul flights.

The seat is a central point of the layout of aircraft cabins. On long-haul flights, the seat can be convertible from a chair-like position to a bed-like position while providing equivalent services in these two configurations, in terms of comfort and of possibility of isolating oneself from the other passengers.

To meet these needs, the solutions proposed by the prior art count on individual seats leaving little latitude of movement between two contiguous seats. However, numerous passengers travel with family, in particular as a couple, and would appreciate the possibility to travel with more closeness between them.

Thus, one object of the present invention is to propose a solution of seats for aircraft passengers that improve the comfort of the passengers, in particular for two passengers of the same family or in a couple.

For this purpose, the invention relates to a double bench seat allowing the passengers that desire so to more freely share the space of their two contiguous seats.

More precisely, the double bench seat for a passenger of transport craft, such as an aircraft, has a sitting configuration and a lying configuration and comprising a substantially vertical shell surrounding two independent twin seats, characterized in that:
- the two twin seats are oriented along the longitudinal axis of the aircraft,
- the two twin seats each assume, independently of one another, at least one chair-like position and one bed-like position,
- the two twin seats comprise a backrest and a seat,
- in the bed-like position, the two twin seats are extended by an extension,
- when the double bench seat is in the lying configuration, the two twin seats are in the bed-like position, arranged so as to be at the same height and to form a continuous horizontal surface with a width and length adapted to form a double bed that can accommodate two lying persons,
- when the double bench seat is in the sitting configuration, the two twin seats are in the chair-like position, arranged so that their respective backrests are incorporated into the substantially vertical shell of the double bench seat, so as to form a continuous vertical wall, separate from an optional headrest, and thus to provide a common backrest for two seated persons.

In the sitting configuration, the vertical wall of the shell incorporating the two backrests of the two twin seats can be substantially flat between the two backrests, or without relief or without a tip, over at least one 80%, or even over at least 90%, of the height of each backrest and/or of the total height of the shell.

The backrest and the seat of the two twin seats can be mobile between the chair-like and bed-like positions.

The backrest of each twin seat can occupy a position incorporated into the shell in the chair-like configuration and a substantially horizontal position forming a bed part in the lying configuration.

The backrest and the seat of the two twin seats can be fixed between the chair-like and bed-like positions, and each twin seat can comprise a leg rest mobile between a retracted position and a substantially horizontal position forming a bed part in the lying configuration.

The double bench seat can comprise a mobile separation wall, which can occupy a separation position in which it forms a wall separating the two twin seats and which can occupy a retracted position in which the two twin seats belong to the same space.

Said separation wall can comprise at least two parts, including a fixed part, and at least one mobile part, the at least one mobile part sliding in vertical translation with respect to the fixed part and being inserted into at least one guide groove located on the shell between the two twin seats.

The double bench seat for a passenger can comprise two boxes located on either side of the two twin seats and being able to be used as an armrest or useful surface.

Each box can incorporate an extension accessible to a passenger of a seat disposed behind the double bench seat.

The double bench seat for a passenger can be intended to be disposed behind an intermediate row of intermediate seats comprising extensions that allow to extend the twin seats of said double bench seat when they are in the bed-like position.

The invention also relates to a face to face module for a passenger, characterized in that it comprises a double bench seat as described above and an additional row disposed face to face, and in that the additional row provides extensions that allow to extend the twin seats of said double bench seat when they are in the bed-like position.

The invention also relates to an arrangement of rows of seats for passengers, characterized in that it comprises such a face to face module that occupies two rows at the end of the arrangement, and in that the following rows consist of an alternation of double bench seats as described above and intermediate seats.

These objects, characteristics and advantages of the present invention will be explained in detail in the following description of two specific embodiments carried out in a non-limiting manner in relation to the appended drawings among which:

Below, longitudinal direction will designate the direction when considering the direction parallel to the longitudinal axis of an airplane. This same reference frame will be used in a manner extended to a seat for an aircraft seat, when considering the position in which it is intended to be mounted inside an airplane.

Two embodiments of the double bench seat 10 are described below:
- a first embodiment, illustrated by FIGS. 1, 2 and 5 to 8, using twin seats 11, 12 with mobile backrest and seat,
- a second embodiment, illustrated by FIGS. 3a, 3b and 4, using twin seats 11, 12 with fixed backrest and seat and mobile leg rest.

In these two embodiments, the double bench seat 10 comprises a shell 1 surrounding two twin seats 11 and 12 as well as two boxes 14 and 15. The shell 1 is a curved vertical wall, the horizontal cross-section of which is in the shape of a U stretched in terms of width. The shell 1 also has a central part S1 and two lateral parts S2, S3 that are perpendicular to it, these parts being substantially flat and connected to each other by curved links. The two twin seats 11 and 12 can occupy a chair-like position and a bed-like position, as will be described in detail below.

The shell 1 has a longitudinal vertical plane of symmetry A1 perpendicular to the central part S1. The vertical plane A1 is parallel to the longitudinal axis of the aircraft. The shell 1 is fixed with respect to the floor of the aircraft on which it is intended to be mounted, and supports the elements of the double bench seat 10 of the invention.

Figure 2:
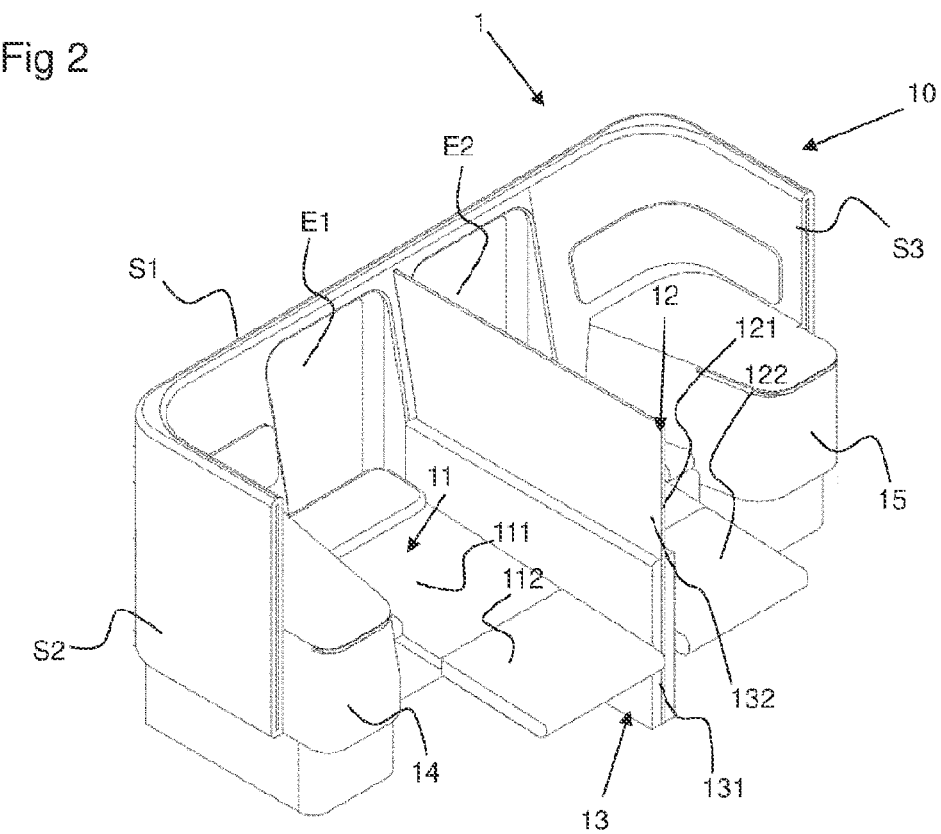
FIG. 2 shows the double bench seat for aircraft passengers according to the first embodiment of the invention in a lying configuration.
Figure 3A:
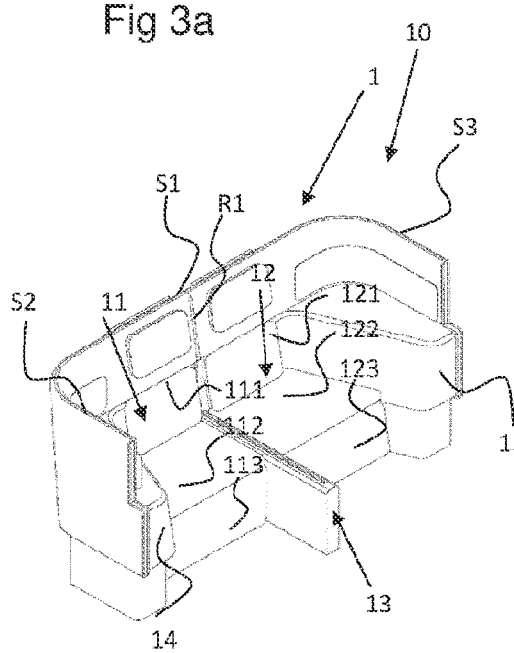
FIG. 3a shows a double bench seat for aircraft passengers according to a second embodiment of the invention in a sitting configuration.
Figure 3B:
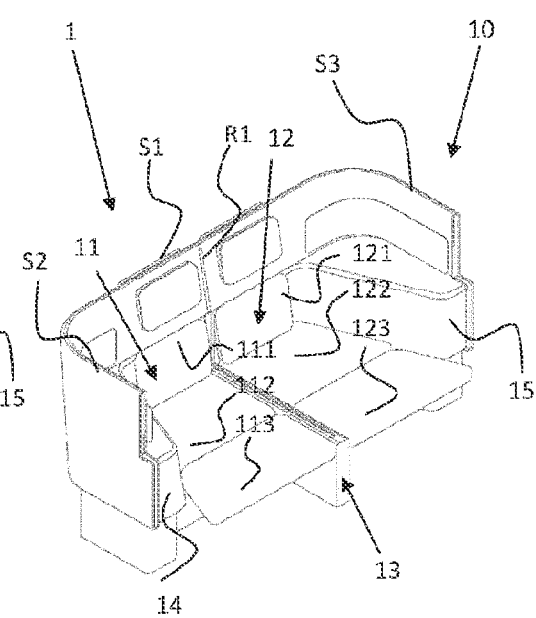
FIG. 3b shows a double bench seat for aircraft passengers according to the second embodiment of the invention in a lying configuration.

In the first embodiment, the central part S1 of the shell 1 has on its rear face two contiguous recesses E1, E2, visible in FIG. 2, and disposed on either side of its plane of symmetry A1, intended respectively to receive the backrests 111, 112 of the mobile twin seats 11, 12.

The mobile twin seats 11, 12 each consist of a mobile backrest 111, 121 and a mobile seat 112, 122, articulated in rotation with respect to one another. The recesses E1, E2 of the shell 1 are made in such a way that they allow to totally incorporate the backrests 111, 121 when the mobile seats are configured in the chair-like position. In this position, the backrests 111, 121 thus occupy a substantially vertical position, slightly inclined towards the rear. The seats 112, 122 occupy a substantially horizontal position.

Each twin seat 11, 12 can carry out a movement of translation with respect to the shell 1, optionally in combination with a movement of rotation of the backrest with respect to the seat. Thus, to go from the chair-like position shown by FIG. 1 to the bed-like position shown by FIG. 2, the seat 112, 122 undergoes a longitudinal translation, moving it away from the shell 1. At the same time, the backrest 111, 121 undergoes a vertical translation with respect to the shell and a simultaneous rotation with respect to the seat 112, 122, so as to go from a substantially vertical position incorporated into the shell to a substantially horizontal position, at least partly occupying the location previously occupied by the seat 112, 122. The backrest 111, 121 and the seat 112, 122 thus form a continuous substantially horizontal surface in the bed-like position of the seat, forming a part of the bed for a passenger.

Thus, when the seat is configured in the bed-like position, the maximum angle formed between the backrest and the seat can be 180 degrees.

The invention is not limited to the embodiment described. In particular the transitions between the chair-like position and the bed-like position can be carried out by any other type of combination of movements.

Figure 4:
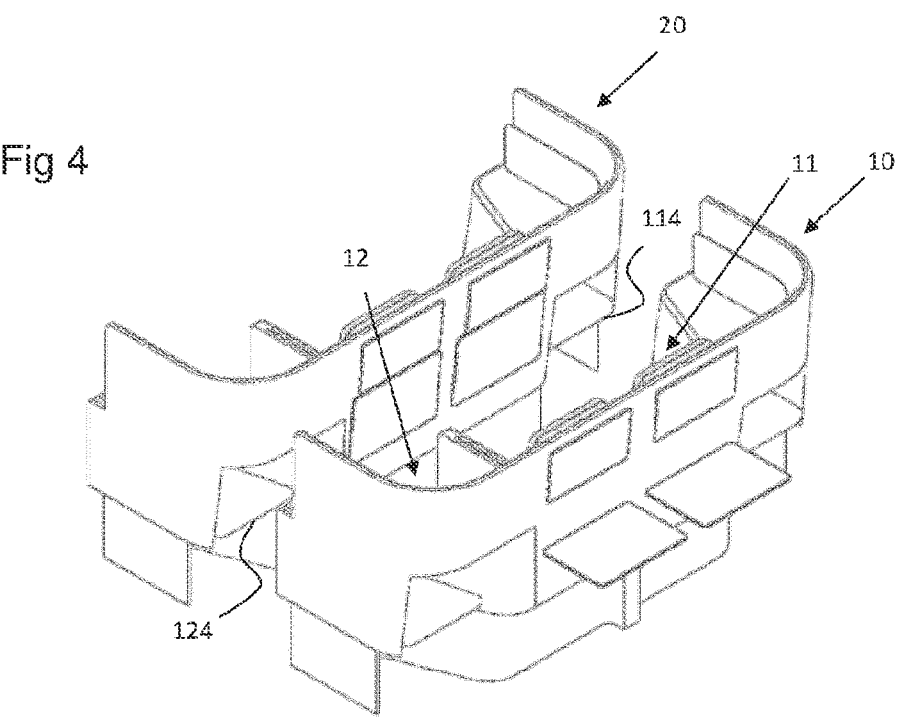
FIG. 4 shows in a rear three-quarter view an arrangement of rows of seats comprising double bench seats according to an embodiment of the invention.

In the second embodiment shown in FIGS. 3 and 4, the shell 1 does not have a recess and the twin seats 11, 12 are partly fixed. Removable backrests 111, 121 are fastened bearing against the shell 1 in the chair-like position and can be removed in the bed-like position to increase the length of the sleeping area. Alternatively, these backrests are fixed and non-removable. Moreover, the seats 112, 122 of the twin seats 11, 12 are fixed.

In the second embodiment, the twin seats 11, 12 also comprise a mobile leg rest 113, 123. The mobile leg rest 113, 123 is articulated in rotation with respect to the fixed seat 112, 122. The movement of the leg rest 113, 123 allows to independently adjust each of the twin seats 11, 12 in the chair-like position or bed-like position. In the chair-like position, shown in FIG. 3a, the leg rest 113, 123 occupies a substantially vertical, or more generally retracted, position in which it frees a space at the front of the seat allowing a passenger to position their feet in the sitting position. In the bed-like position, shown in FIG. 3b, it is raised by rotation with respect to the seat, until it occupies a substantially horizontal position extending the seat and forming a part of the bed of the passenger.

In an alternative of the second embodiment, the leg rest 113, 123 has a flared shape at its distal end, thus providing greater latitude of movement to a user when the seat is in the bed-like position. Moreover, this latitude of movement allows a user of the twin seat in the bed-like position to rest their feet on an extension that would be located laterally with respect to the direction of the twin seat 11, 12.

In all the embodiments, when the two twin seats 11, 12 are in the chair-like position, the double bench seat is in the sitting configuration. The two seats 11, 12 are arranged so that their respective backrests 111, 121 are incorporated into the substantially vertical shell 1 of the double bench seat, so as to form a continuous vertical wall, separate from an optional headrest.

In other words, when the two twin seats are in the chair-like position, the backrests 111, 112 form an integral part of the curved wall defined by the shell. In the first embodiment, the backrests are incorporated into the shell by filling the recesses E1, E2, so as to form an integral part of the curved wall defined by the shell. In other words, the shell and the backrests together form a curved vertical wall not having any discontinuity. The assembly formed by the shell 1 and the incorporated backrests 111, 121 forms a shared and continuous backrest for the two twin seats 11, 12.

Thus, the invention has the advantage of forming a single surface, equivalent to a single backrest, despite the existence of two distinct seats. The shell erases any separation between the two seats, which are no longer perceived as two distinct parts of the surface of the backrest. The double bench seat thus forms a shared backrest for two seated persons. Via this construction, the two persons have the possibility of positioning themselves indifferently over the entire width of the double bench seat, thus taking advantage as best as possible of a maximal space. In other words, their positioning is not strictly limited to the backrest of their assigned seat. The comfort is thus increased.

In particular, the surface of each backrest 111, 121 of each twin seat 11, 12 is in the continuity of the surface of the neighboring shell. The surface remains continuous between the two backrests 111, 121, which allows the two passengers to be brought closer together. In other words, the shell does not have a separation, even slight, at the backrests between the two passengers in the sitting configuration. According to the embodiment, this continuity is formed by a substantially flat surface between the two seats. Alternatively, it can be formed by any surface not having a marked relief. This continuity is noticeable by observing a horizontal cross-section of the shell. Advantageously, this continuity extends over the entire height of the backrests. Alternatively, it extends over at least 80%, or even 90%, of the height of each backrest or of the total height of the shell.

Moreover, in the two embodiments, when the two twin seats 11, 12 are in the bed-like position, the double bench seat is in the lying configuration. The seats are thus arranged so as to be at the same height and to form a continuous horizontal surface with a width and length adapted to form a double bed that can accommodate two lying persons. The overall space is here also optimized for the two persons.

Naturally, the two seats remain independent and can occupy different positions.

In both embodiments, the shell 1 can also have a vertical groove R1 on its rear face. This groove R1, located between two twin seats 11, 12, is intended for the guiding in vertical translation of a removable separation wall 13. This separation wall 13 is disposed between the twin mobile seats 11, 12 and allows to separate the space of the double bench seat 10 into two individual subspaces in a high position, shown by FIG. 2.

According to the embodiment, the separation wall 13 consists of a fixed part 131 and of at least one mobile part 132 that slides vertically in the fixed part 131. Alternatively, there can be several mobile parts, able to occupy several positions according to an operation of the telescopic type.

Figure 6:
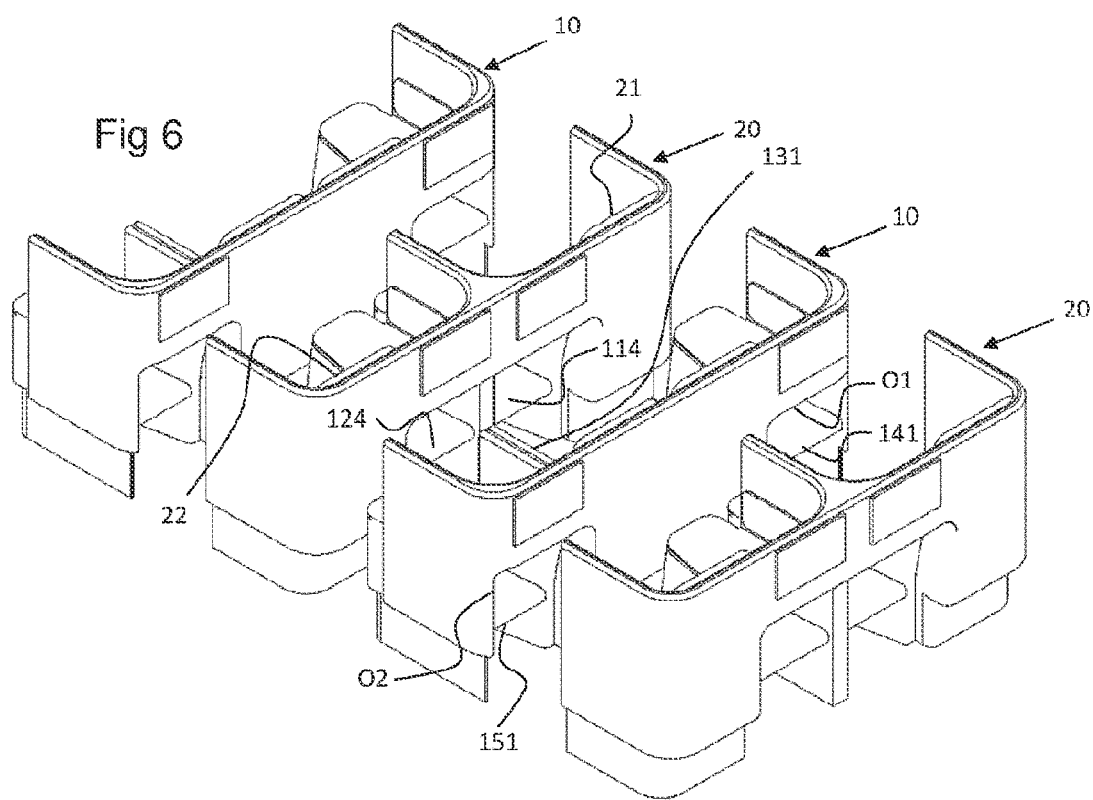
FIG. 6 shows in a rear three-quarter view an arrangement of rows of seats comprising double bench seats according to an embodiment of the invention.

The fixed part 131 presents itself as a hollow rectangular partition housing a slide mechanism intended for the movement in vertical translation of the at least one mobile part 132. The fixed part 131 of the separation wall 13 is fastened to the floor and to the shell 1, perpendicularly to the central part of the shell 1, and is located in the vertical plane of symmetry A1 of the shell 1. In its longitudinal dimension, the fixed part 131 extends between the shell 1 of the bench seat 10 and substantially an intermediate row 20 of intermediate seats located in front of the latter, so as to create a fixed physical separation between the two twin seats 11, 12 at the legs, as shown by FIG. 6. Moreover, the height of the fixed part 131 (measured in the vertical direction) corresponds to the height of the plane formed by the seats 112, 122 of the twin seats 11, 12, as is particularly visible in FIG. 1.

Figure 1:
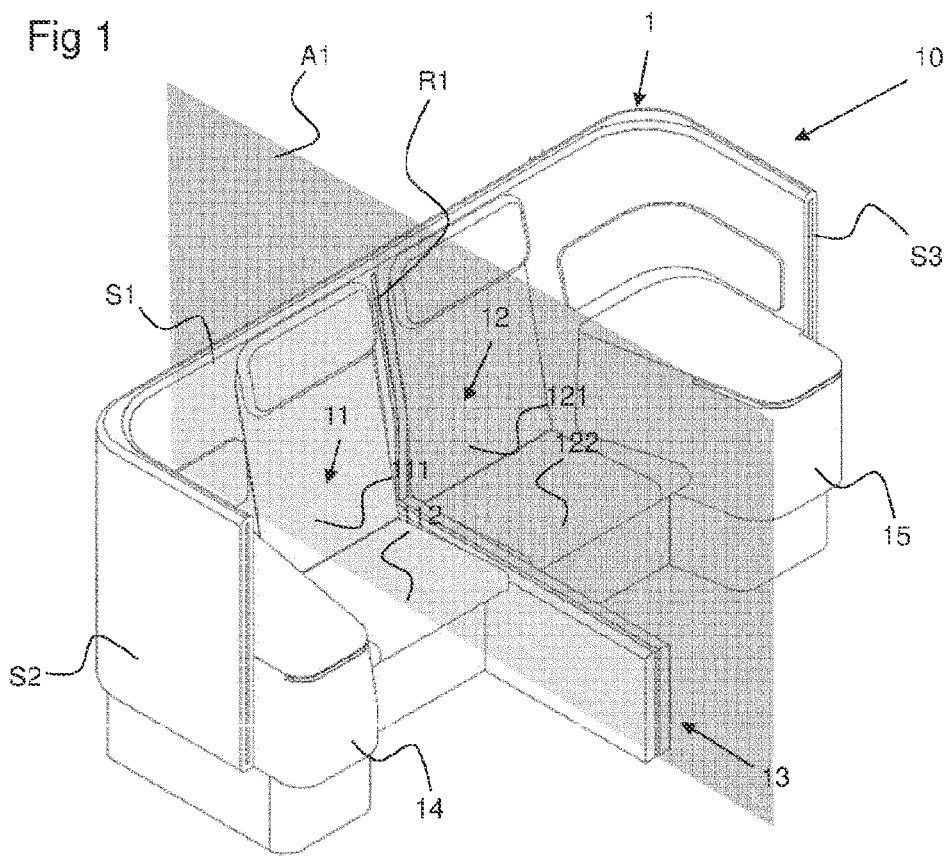
FIG. 1 shows a double bench seat for aircraft passengers according to a first embodiment of the invention in a sitting configuration.

In the two embodiments described, the at least one mobile part 132 of the separation wall 13 can assume at least:
  a "high" position, shown in FIG. 2, corresponding to a maximum deployment of the separation wall 13, in which it separates the double bench seat 10 into two separate seats;
  and a "low" position, shown in FIG. 1, corresponding to the complete retraction of the mobile part inside the fixed part, in which the double bench seat 10 forms a convivial single space for two persons. The low position of the separation wall 13 corresponds to the height of the sleeping area.

Alternatively, the separation wall 13 can assume a "low" position, an "intermediate" position and "high" positions. The intermediate position corresponds to a partial retraction of the at least one mobile part inside the fixed part, which positions the separation wall 13 at the height of an armrest, so as to form a central armrest shared by the two seats. The high positions correspond to a deployment of the separation wall 13 located beyond the intermediate position and able to go up to the maximum deployment of the separation wall, the latter position being shown in FIG. 2. In the high position, the separation wall 13 forms two individual armrests and divides the double bench seat 10 into two separate seats.

When it is totally deployed, the at least one mobile part 132 extends substantially longitudinally between the shell 1 of the bench seat 10 and the intermediate row 20 of intermediate seats located in front of the latter, and vertically, over a given maximum height, close to the height of the shell 1, to form a complete separation between the two twin seats 11, 12.

In an alternative of the embodiments presented, the maximum height of deployment of the separation wall 13 can assume any other height, optionally less than that of the shell 1.

In the embodiments, the movement of the at least one mobile part 132 is further guided by the vertical groove R1 present on the rear face of the shell 1 and located between the two twin seats 11, 12 as mentioned above.

In an alternative of the embodiments presented, a complementary groove used to guide the at least one mobile part at its front end opposite to its end guided in the groove R1 of the shell is arranged on the rear face of the intermediate row 20 of intermediate seats located just in front of the double bench seat 10.

The at least one mobile part 132 can be at least partly translucid or opaque.

According to the embodiment, the separation wall 13 can be partly made of materials allowing a visual and/or acoustic isolation.

The adjustment of the position of the separation wall 13 can be controlled by each of the passengers of the twin seats 11 and 12.

Naturally, the invention is not limited to the embodiments described. The separation wall 13 could have any other mobility to go from a retracted position to a separation position. Such a mobility can for example be obtained by a rotation, or a combination of rotation(s) and translation(s).

In the two embodiments presented, the central part S1 of the shell 1 has two lateral openings O1, O2 open on the rear face of the shell 1 (shown in FIG. 6), located facing boxes 14, 15 of the double bench seat 10. These lateral openings O1, O2 are used by passengers occupying the seats located behind the double bench seat 10, to allow them to access an additional space 141, 151 located inside the boxes 14, 15.

The two boxes 14, 15 are arranged symmetrically with respect to one another with respect to the vertical plane of symmetry A1. The horizontal cross-section of the boxes has the shape of a right trapezoid which is rounded at the angles. The cross-section is smaller towards the front of the boxes. The boxes are disposed against the shell 1 as follows:
  the base of the trapezoid formed by said cross-section of the boxes 14, 15 is positioned against the central part S1 of the shell 1, and the rounded right angle located at the base of the trapezoid formed by the boxes is fitted to the rounded angles of the shell 1.

The boxes 14, 15 are hollow and open towards the rear of the shell 1. They thus form an additional space 141, 151, as mentioned above, accessible by the passengers positioned behind the double bench seat. This additional space 141, 151 comprises a flat additional surface or extension 114, 124, visible in FIG. 6, intended to form a bed extension for a seat located behind the double bench seat 10.

The boxes 14, 15 also define a wide armrest for each of the users of the twin seats 11, 12. The upper surface of the boxes 14, 15 also provides a useful surface allowing for example to place objects.

The two lateral parts S2, S3 of the shell 1 define the space of the double bench seat. A retractable lateral wall 16, 17, shown in FIG. 5, can extend each lateral part S2, S3 of the shell, in order to create a partition between the space of the double bench seat 10 and the aisle. This lateral wall slides in longitudinal translation inside the lateral parts S2, S3 of the shell 1. It thus forms a separation wall. It can form a door for access to the space of the double bench seat from a contiguous aisle. In alternative embodiments this door for access to the space of the double bench seat can be made by other types of mechanisms and/or materials capable of providing visual isolation, for example such as a curtain.

In one embodiment, the shell 1 can be provided with a soundproofing coating.

The invention also relates to the layout of an aircraft section with double bench seats 10 as described above.

This layout comprises an arrangement, for example shown in FIG. 6, in which a double bench seat 10 according to the invention is disposed behind an intermediate row 20, so that the twin seats 11, 12 of the double bench seat 10 are extended, in their bed-like position, by an additional surface or extension 114, 124, provided by this intermediate row 20. An intermediate row 20 thus advantageously comprises a bench seat comprising two boxes similar to those of the double bench seat 10, positioned as an extension of the twin seats of the double bench seat 10. Again advantageously, this intermediate row 20 also comprises two seats 21, 22.

Figure 5:
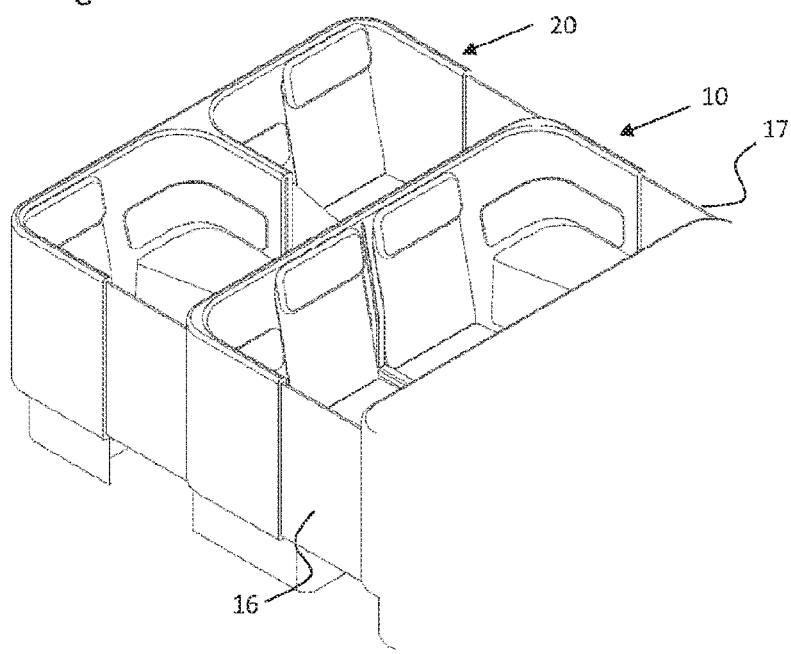
FIG. 5 shows in a front three-quarter view an arrangement of rows of seats comprising a double bench seat according to an embodiment of the invention.

An aircraft layout with double bench seats 10 according to the first embodiment is shown by FIGS. 5 and 6. The layout of an aircraft according to this embodiment comprises an alternation between double bench seats 10 as described and intermediate rows 20.

An aircraft layout with double bench seats 10 according to the second embodiment is shown by FIG. 4. It is based on a succession of double bench seats according to the invention, disposed one after another. In such an aircraft layout, the intermediate row 20 mentioned above is thus an identical bench seat 10. The extensions 114, 124 of a first double bench seat 10 are thus located in the boxes 14, 15 of a second double bench seat 10 located in front of the first double bench seat 10. In this embodiment, the leg rest 113, 123 has a flared shape at its distal end, thus providing greater latitude of movement to a user when the seat is in the bed-like position. This latitude of movement allows the user to comfortably access the extensions 114, 124 as they are shown in FIG. 4, that is to say located laterally with respect to the direction of the seat 11, 12.

The layout of an aircraft section with double bench seats 10 includes a specific implementation with regard to the first row, or even the last row, of the section, in order for the latter to provide the extensions 114, 124 required for the use of a bench seat 10 located behind this first row.

Figure 7:
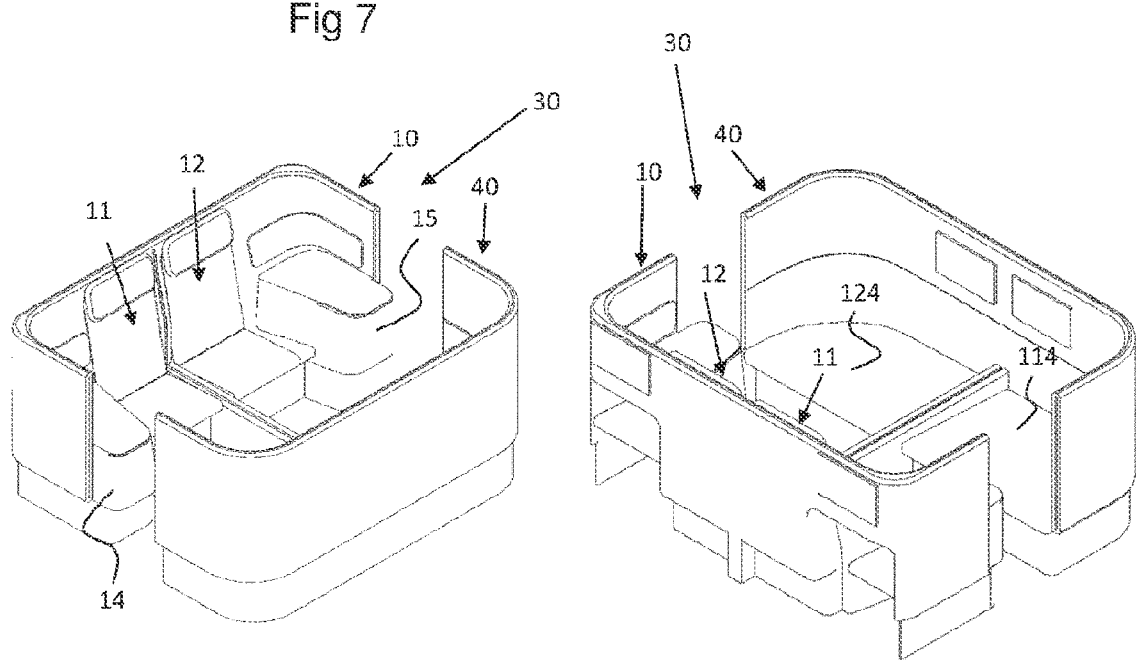
FIG. 7 shows in perspective a face to face module containing a double bench seat according to an embodiment of the invention.
Figure 8:
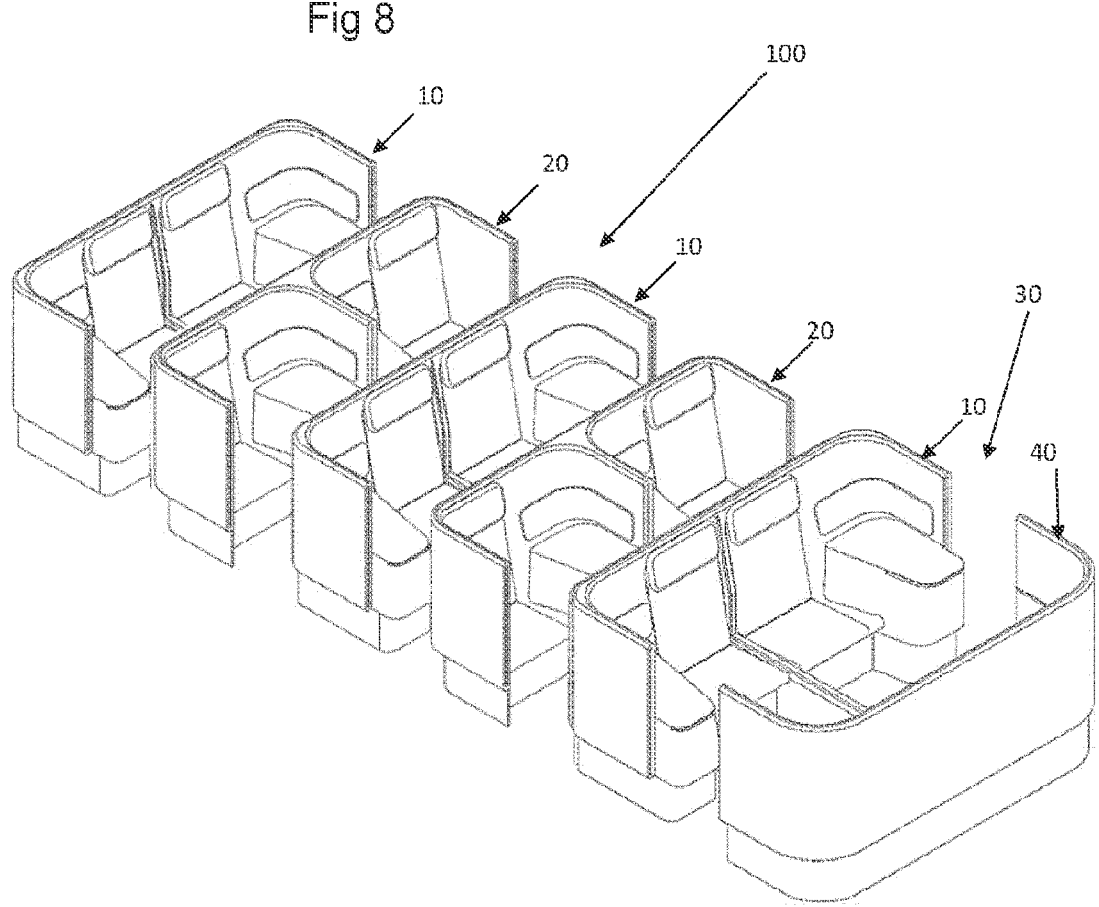
FIG. 8 shows in perspective an arrangement of rows of seats comprising double bench seat according to an embodiment of the invention and a face to face module containing a double bench seat according to an embodiment of the invention.

Thus, in the specific case in which no intermediate row is located in front of a double bench seat 10, an additional row 40 can be disposed so as to face the double bench seat 10, to provide it with extensions 114, 124. This assembly, called face to face module 30, is illustrated by FIG. 7.

Thus, the layout of the aircraft section with double bench seats 10 can consist of a face to face module 30 followed by an alternation of intermediate rows 20 and double bench seats 10 according to one of the alternative embodiments presented.

Alternatively, the alternation of intermediate rows 20 and of double bench seats 10 consists of a succession of double bench seats 10.

More generally, the invention relates to the layout of transport craft, such as aerial, nautical or railway transport vehicles with double bench seats 10 according to the invention, in particular the layout of ferry boats or cruise ships, as well as the layout of long-distance trains. The invention relates more particularly to layouts of a business class or of a first class or of any other premium class of such aerial, nautical or railway transport vehicles.

The invention claimed is:

1. A double bench seat for a passenger of an aircraft having a sitting configuration and a lying configuration and comprising a substantially vertical shell surrounding two independent twin seats, wherein:
   the two twin seats are oriented along the longitudinal axis of the aircraft,
   the two twin seats each assume, independently of one another, at least one chair-like position and one bed-like position,
   the two twin seats comprise a backrest and a seat,
   in the bed-like position, the two twin seats are extended by an extension,
   when the double bench seat is in the lying configuration, the two twin seats are in the bed-like position, arranged so as to be at the same height and to form a continuous horizontal surface with a width and length adapted to form a double bed that can accommodate two lying persons,
   when the double bench seat is in the sitting configuration, the two twin seats are in the chair-like position, arranged so that their respective backrests are totally incorporated into the substantially vertical shell of the double bench seat, so as to form a continuous vertical wall, separate from an optional headrest, and thus to provide a common backrest for two seated persons, wherein the shell comprises two recesses made in such a way that the two recesses allow to totally incorporate the backrests, the two recesses each comprising an upper horizontal surface located at a height lower than an upper horizontal surface of the shell.

2. The double bench seat for a passenger according to claim 1, wherein in the sitting configuration, the vertical wall of the shell incorporating the two backrests of the two twin seats is substantially flat between the two backrests, or without relief or without a tip, over at least one 80%, or even over at least 90%, of the height of each backrest and/or of the total height of the shell.

3. The double bench seat for a passenger according to claim 1, wherein the backrest and the seat of the two twin seats are mobile between the chair-like and bed-like positions.

4. The double bench seat for a passenger according to claim 1, wherein the backrest of each twin seat occupies a position incorporated into the shell in the chair-like configuration and a substantially horizontal position forming a bed part in the lying configuration.

5. The double bench seat for a passenger according to claim 1, wherein the backrest and the seat of the two twin seats are fixed between the chair-like and bed-like positions, and in that each twin seat comprises a leg rest mobile between a retracted position and a substantially horizontal position forming a bed part in the lying configuration.

6. The double bench seat for a passenger according to claim 1, further comprising a mobile separation wall, which can occupy a separation position in which it forms a wall separating the two twin seats and which can occupy a retracted position in which the two twin seats belong to the same space.

7. The double bench seat for a passenger according to claim 6, wherein the mobile separation wall comprises at least two parts, including a fixed part and at least one mobile part, the at least one mobile part sliding in vertical translation with respect to the fixed part and being inserted into at least one guide groove located on the shell between the two twin seats.

8. The double bench seat for a passenger according to claim 1, further comprising two boxes located on either side of the two twin seats and being able to be used as an armrest or useful surface.

9. The double bench seat for a passenger according to claim 8, wherein each of the two boxes incorporates an extension accessible to a passenger of a seat disposed behind the double bench seat.

10. The double bench seat for a passenger according to claim 1, wherein the double bench seat is configured to be disposed behind an intermediate row of intermediate seats comprising extensions that allow to extend the twin seats of said double bench seat when they are in the bed-like position.

11. A face to face module for a passenger, comprising the double bench seat according to claim 1, and an additional row disposed face to face, and in that the additional row provides extensions that allow to extend the twin seats of said double bench seat when they are in the bed-like position.

12. An arrangement of rows of seats for passengers, comprising the face to face module according to claim 11, wherein the face to face module occupies two rows at the end of the arrangement.

* * * * *